United States Patent [19]
Brown

[11] 3,764,170
[45] Oct. 9, 1973

[54] UNIVERSAL WAVE GUIDE FLANGE

[75] Inventor: Charles D. Brown, Raymond, Maine

[73] Assignee: Sola Basic Industries, Inc., Milwaukee, Wis.

[22] Filed: Nov. 23, 1971

[21] Appl. No.: 201,522

[52] U.S. Cl. ............... 285/412, 285/368, 333/98 R
[51] Int. Cl. .............................................. F16l 21/02
[58] Field of Search .................. 285/364, 406, 337, 285/413, 411, 368, 412, 367; 333/98 R

[56] References Cited
UNITED STATES PATENTS

| | | | |
|---|---|---|---|
| 3,661,409 | 5/1972 | Brown | 285/367 X |
| 3,070,388 | 12/1962 | Werth | 285/411 |
| 3,479,069 | 11/1969 | Sedam | 285/364 |
| 2,996,318 | 8/1961 | Gravert | 285/364 X |
| 3,165,341 | 1/1965 | Burns et al | 285/406 |
| 885,786 | 4/1908 | Prinz | 285/406 X |
| 2,923,561 | 2/1960 | Merrill | 285/413 |

FOREIGN PATENTS OR APPLICATIONS

| | | | |
|---|---|---|---|
| 556,670 | 4/1958 | Canada | 285/368 |

Primary Examiner—Thomas F. Callaghan
Attorney—D. Verner Smythe et al.

[57] ABSTRACT

A wave guide flange assembly comprises male and female flanges on the cooperating ends of a pair of tubular conductors to be connected in end-to-end relationship with there being a number of axial openings uniformly spaced in the female flange. A bolt is partially threaded into each of said axial openings, and a clamping unit has a bore through which the bolt passes. A clamping unit is provided for each bolt, and the bore may be slotted so that the clamping unit slides radially into locking engagement with an annular shoulder on the male flange. The clamping unit may have an eccentric shape so that rotation thereof will cause a portion to lockingly engage with the annular shoulder. The clamping unit may also comprise pairs of clamping blocks interconnected by tie bars.

5 Claims, 13 Drawing Figures

PATENTED OCT 9 1973 3,764,170

INVENTOR
CHARLES D. BROWN
BY Smythe & Moore
ATTORNEYS

INVENTOR
CHARLES D. BROWN
BY
Smythe & Moore
ATTORNEYS

UNIVERSAL WAVE GUIDE FLANGE

This invention relates to wave guide flanges for transfer of electromagnetic energy and means for connecting the same.

A wave guide is generally considered to be any enclosure that restrains the fields and directs the flow of electromagnetic energy. Such a wave guide is generally tubular and may have a circular or rectangular cross section. A tubular wave guide, which may extend for a considerable distance, is generally constructed from a number of tubular sections which are interconnected in end-to-end relationship. The tubular sections may be provided without flanges for field installation or for use with a particular connection preferred by the user.

When the tubular sections are provided with flanged ends, a suitable clamping or connecting structure must be used. It has been proposed to provide corresponding ends of tubular sections with male and female clamps with clamping blocks being attached to a peripheral portion of the female flange and removable into locking position with a portion of the male flange. The clamping blocks have been provided with various forms of eccentrics and cams so that rotation of an individual clamp will cause the clamp to lockingly engage the male flange. Other clamps have been provided with slots so that the individual clamps can be moved radially into and out of locking engagement with the male flange. The use of such movable clamping slots has been generally unsatisfactory since considerable time was required to interconnect the male and female flanges. Further, such a connection required a relatively large number of parts, such as clamping blocks and fasteners, which not only increase the time required for assembly but also increase the costs of manufacture.

One of the objects of the present invention is to provide an improved wave guide assembly for connecting tubular conductors in end-to-end relationship.

Another of the objects of this invention is to provide a clamping unit which can be moved radially into locking and unlocking relationship for end-to-end tubular conductors.

A still further object of the present invention is to provide a wave guide flange assembly which is simple in construction, comprises a minimum of components, and is economical to manufacture.

A wave guide flange assembly according to the present invention may essentially comprise a male flange having an annular shoulder thereon and secured to an end of a tubular conductor. A female flange is secured to an end of another tubular conductor and is adapted to receive the male flange therein. A clamping unit comprising a pair of interconnected clamping blocks is movably mounted on the female flange for radial sliding movement into and out of locking engagement with the angular shoulder on the male flange.

As a modification, the clamping unit may comprise a single clamping block having a slot therethrough through which passes a bolt to slidably mount the block on the female flange. The block is provided with a lip which is engageable with an annular shoulder on the male flange. In a further modification, the clamping unit may comprise an eccentric mounted on the bolt and rotated into locking engagement with the shoulder on the annular flange.

Other objects, advantages and features of the present invention will become apparent from the accompanying description and drawings, which are merely exemplary.

In the drawings.

Proceeding next to the drawings wherein like reference symbols indicate the same parts throughout the various views, a specific embodiment of the present invention will be described in detail.

Figure 1:
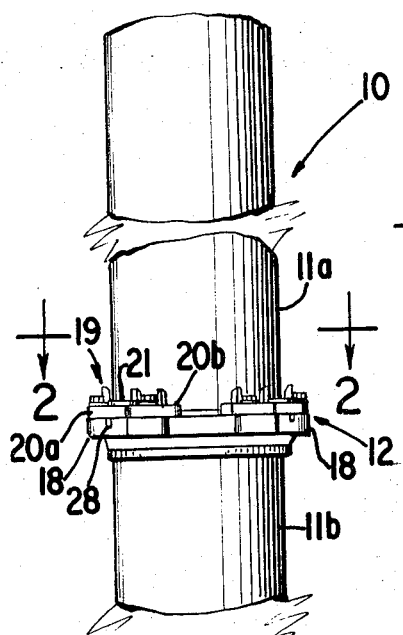
FIG. 1 is an elevational view of a portion of a wave guide incorporating flange assemblies according to the present invention.

In FIG. 1, there is indicated generally at 10 a wave guide having a circular cross section and assembled from a plurality of sections 11 which are connected in end-to-end relationship by the flange assembly disclosed herein. The flange assembly is indicated generally at 12 and is illustrated in greater detail in FIGS. 2 through 5.

Figure 3:
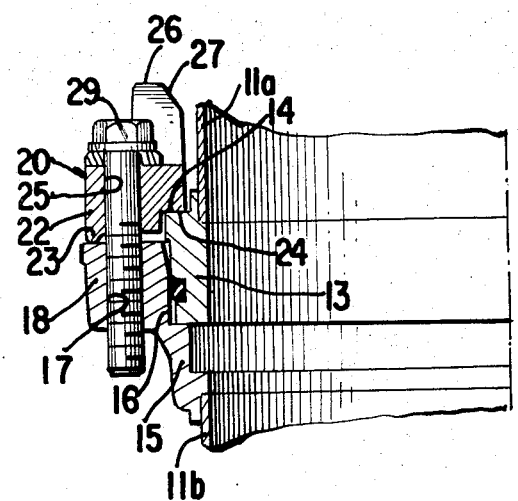
FIG. 3 is a sectional view taken along the line 3—3 of FIG. 2.

With particular reference to FIG. 3, a tubular conductor 11a has a male flange 13 attached to its end with the inner diameter of the male flange being equal to the inner diameter of the tubular conductor 11a. The male flange 13 is provided with an annular shoulder 14 which is facing in a direction opposite from that of the tubular conductor 11b to which the conductor 11a is to be connected.

The tubular conductor 11b has a female flange 15 attached to its outer end, and the flange is provided with a socket portion 16 into which the male flange 13 is inserted as shown in FIG. 3. The female flange 15 is provided with a plurality of axially extending threaded openings 17, each being in a radially projecting pad 18, the total of which is an even number and all of the openings being substantially uniformly circumferentially shaped around the flange.

Figure 2:
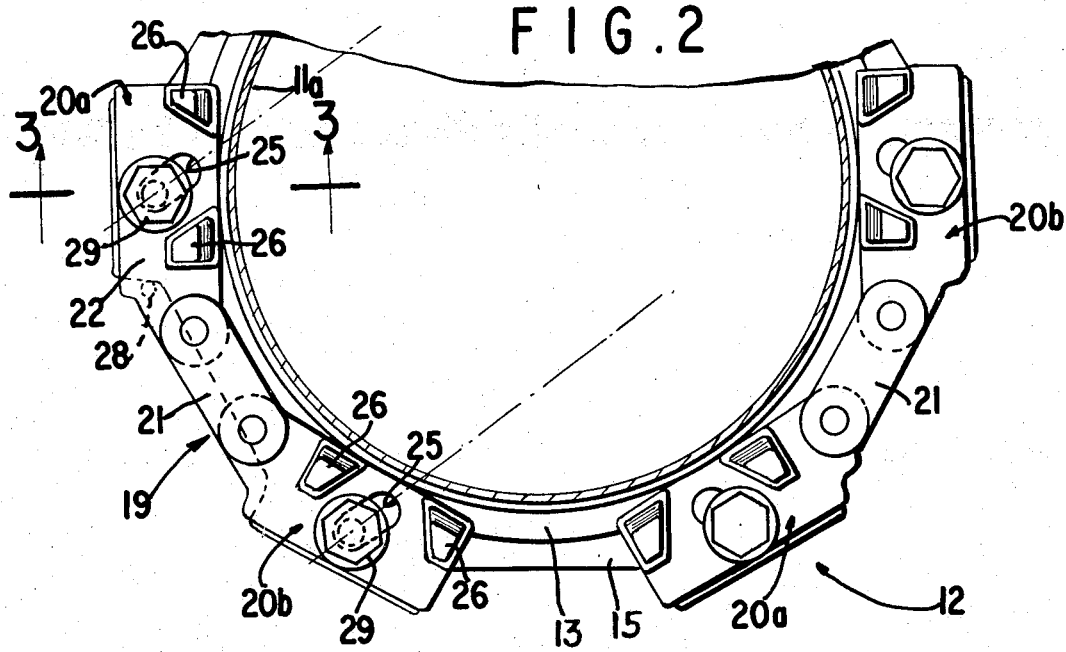
FIG. 2 is a portion of a sectional view taken along the line 2—2 of FIG. 1 and showing in plan view a clamp unit of the present invention.
Figure 4:
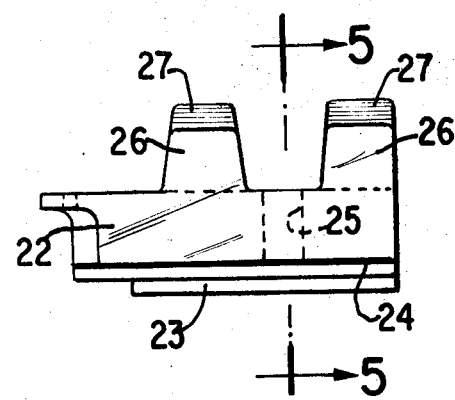
FIG. 4 is a front elevational view of one of the clamps interconnected in the clamping unit shown in FIG. 2.
Figure 5:
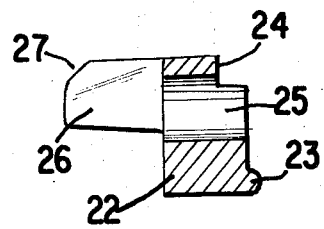
FIG. 5 is a sectional view taken along the line 5—5 of FIG. 4.

A clamp unit which is indicated generally at 19 in FIG. 2 comprises clamps 20a and 20b, which are illustrated in detail in FIGS. 4 and 5, and interconnected at their inner ends by a tie bar 21. The clamp blocks 20a and 20b are identical except they are of the opposite hand.

Each clamp 20 comprises a body portion 22 having a downwardly protruding lip 23 on the outer edge with the lip bearing on the upper surface of the respective pad 18 on the female flange. On the inner side of the body portion, there is provided an undercut or lip portion 24 which rests upon the annular shoulder 14 of the male flange 13 when the clamp 20 is in the locking position. There is a slot 25 through the central portion of the body portion with the slot being angularly disposed with respect to a radius of the conductor 11 passing therethrough. The slots 25 of the clamps 20a and 20b preferably are so positioned relative to each other that the slots are substantially parallel when the clamps are assembled into a clamp unit 19.

From the upper face of the body portion of each clamp, there extends upwardly a pair of vertical guide lugs 26 with their upper corners on the inner edge thereof being bevelled at 27. Projecting downwardly from the bottom surface of each clamp 20 is also a pin 28 which is engageable with a portion of the pad 18 to detent the inward radial movement of the clamping unit into proper position for bolting fast.

A clamp unit 19 including the tie bar 21 is slidably mounted on a pair of adjoining openings in the female flange 15 by means of bolts 29 which are screwed into the threaded opening 17 in the female flange pads 18. Each bolt is thus fixedly secured in the female flange but passes through a slot 25 in the clamp so that the clamp is movable with respect to the female flange 15.

The clamp unit 19 as shown in FIGS. 2 and 3 is illustrated in its locking position wherein the clamp unit is moved radially inwardly so that the lips 25 of each of the clamps 20 are positioned on the annular shoulder 14 of the male flange 13. The bolts 29 are tightened downwardly against the clamps, and the clamps are secured in this locking position. Thus, the conductors 11a and 11b are tightly secured in end-to-end relationship.

The conductors 11a and 11b can be quickly disassembled from each other merely by loosening the bolts 29 and moving each clamp unit 19 radially outwardly from the wave guide. The slots 25 are so dimensioned that moving the clamps to the limits of the slots will release the annular shoulder 14 on the male flange from the undercut portion 24 on each clamp 20. The conductor 11a is thus disconnected from the conductor 11b and can be separated therefrom.

Figure 8:
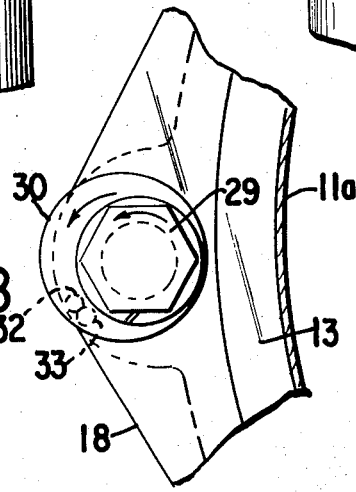
FIG. 8 is a broken top plan view in enlarged scale of a clamping member of FIG. 6 and showing the clamping member rotated to its unlocked position.
Figure 9:
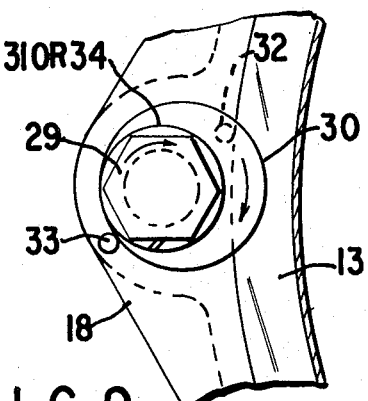
FIG. 9 is a view similar to that of FIG. 8 but showing the clamping unit in its locked position.
Figure 10:
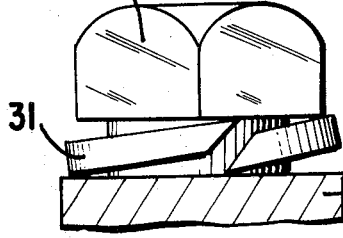
FIG. 10 is an elevational view in enlarged scale of the clamping unit of FIG. 8 to illustrate a spring washer for maintaining the clamping member in its adjusted position.

In FIGS. 6 to 10, inclusive, there is provided a modification of the clamping arrangement wherein eccentric members are rotated to and from the locking and unlocking positions. An eccentric clamping element 30 is mounted on the bolt 29 and is attached to the bolt 29 for rotation therewith by a spring lock washer 31. The underside of the clamping element 30 may be provided with a downwardly depending pin 32 which is engageable with an upwardly extending pin 33 in the upper face of the pad 18 when the clamping element is in its unlocked position as shown in FIG. 8. The pin 32 and pin 33 thus indicate the unlocked position of the clamping arrangement. When the clamping element is in its locked position as shown in FIG. 9, the bolt is rotated in a clockwise direction as indicated by the arrows. The washer 31 will cause the clamping element 30 to also rotate in this direction to its locked position.

Figure 6:
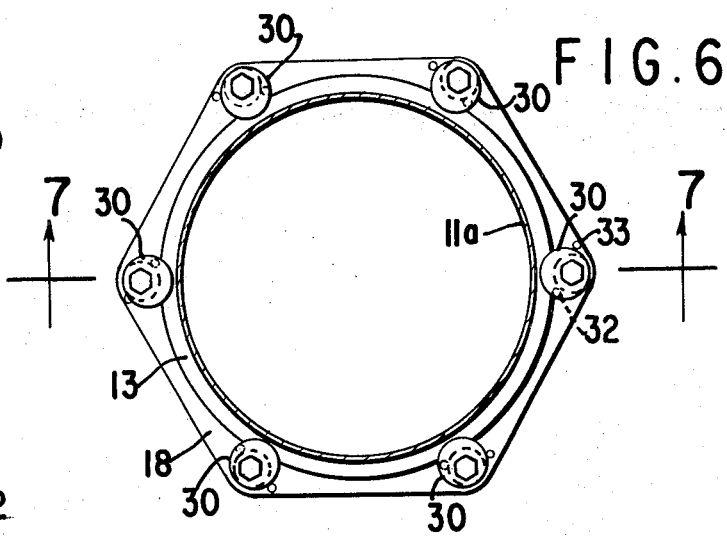
FIG. 6 is a sectional plan view showing another modification.
Figure 7:
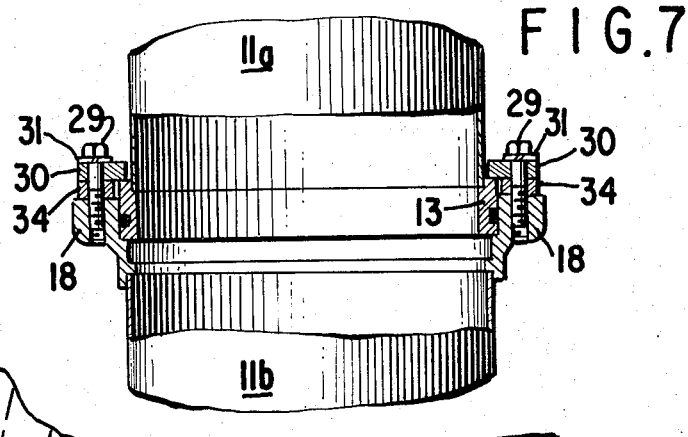
FIG. 7 is a sectional view taken along the line 7—7 of FIG. 6.

With the modification of FIGS. 6 to 10, inclusive, it is necessary that each of the bolts 29 surrounding the clamping unit as shown in FIG. 6 be individually adjusted to their locked positions in order to clamp the ends of the tubular conductors together. In a like manner, each of the bolts must be separately unlocked to unclamp the tubular conductors.

A bushing 34 may be interposed between the upper surface of the pad 18 and the clamping element 30 in order to position the clamping element 30 at the correct height with respect to the shoulder on the male flange 13.

Figure 11:
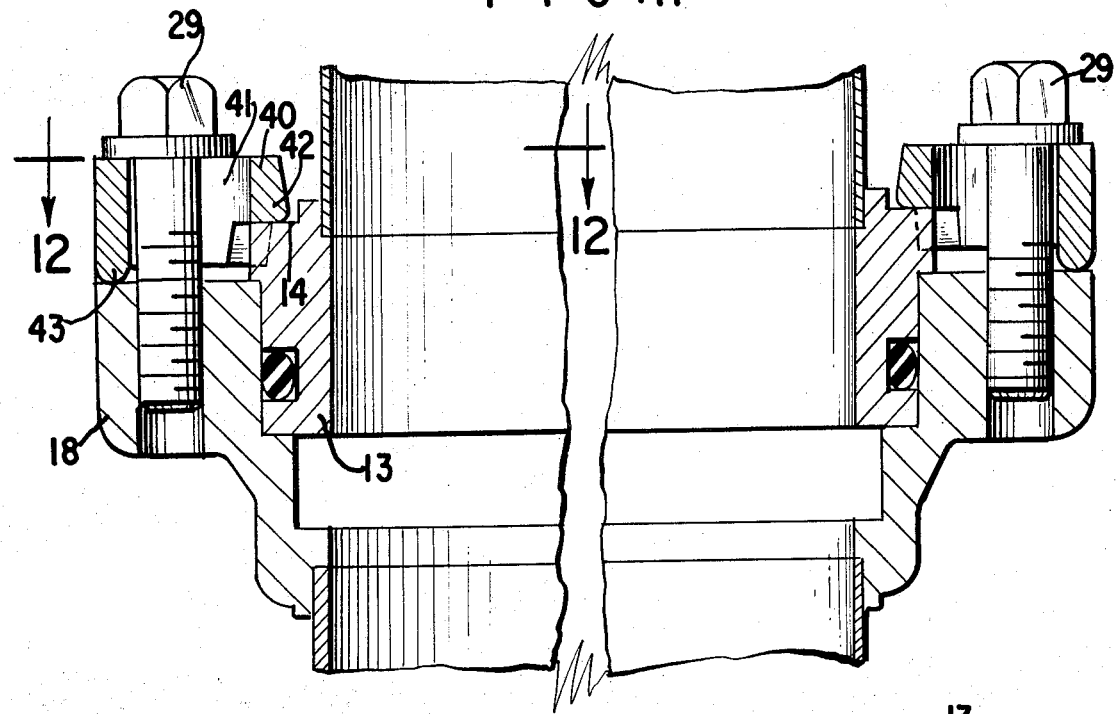
FIG. 11 is a view similar to that of FIG. 7 but showing a still further modification of a clamping member.
Figure 12:
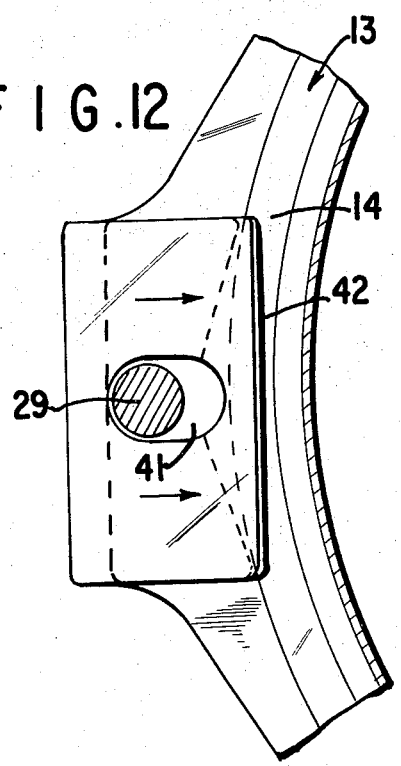
FIG. 12 is a sectional view taken along the line 12—12 of FIG. 11 and showing the clamping member in its locked position.
Figure 13:
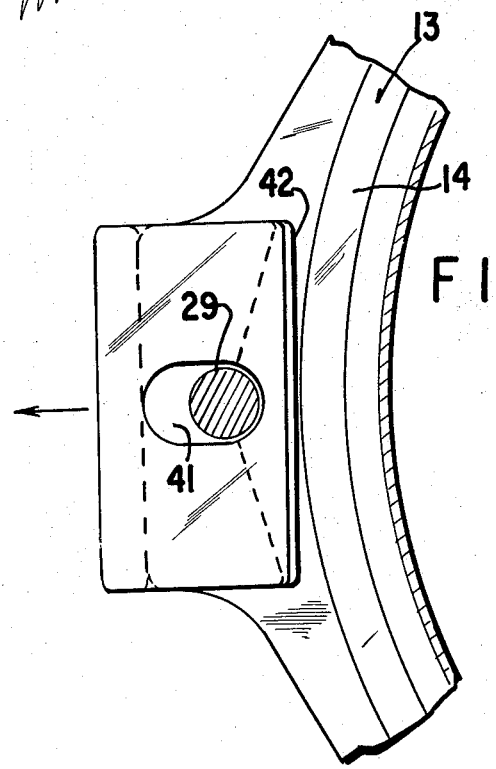
FIG. 13 is a view similar to that of FIG. 12 but showing the clamping member in its unlocked position.

In the modification of FIGS. 11 to 13, inclusive, the clamping elements comprise clamping blocks 40, each of which are provided with a substantially radial slot 41 through which passes the bolt 29. The clamping block 40 is provided with a lip 42 which is engageable with the shoulder 14 on the male flange 13. In addition, there is a protrusion 43 on the outer edge of the underside of the clamping block 40 to engage the upper surface of the pad 18.

The clamping blocks 40 are movable radially into the locking and unlocking positions as indicated by the directions of the arrows in FIGS. 12 and 13. To move the clamping block 40 into locking engagement, the bolt 29 is loosened and the block moved in the direction of the arrows shown in FIG. 12 until the lip 42 engages the upper surface of the shoulder 14. The bolt is then tightened. In a similar manner, each of the bolts and clamping blocks of the clamping unit are individually adjusted.

The unlocking operation is the opposite in that the bolts are unloosened and the clamping blocks moved radially outwardly in the direction of the arrow shown in FIG. 13.

It is therefore apparent that conductor sections equipped with the flange assembly according to the present invention can be assembled or disassembled without the necessity for removal of the flange assembly. Once the flange assembly has been installed, it is only necessary that the bolts be loosened to move the clamp unit outwardly to detach a tubular conductor from another tubular conductor.

It will be understood that various details of construction and arrangement of parts may be made without departing from the spirit of the invention except as defined in the appended claims.

What is claimed is:

1. A wave guide flange assembly for connecting tubular conductors in end-to-end relationship, and comprising a male flange having an annular shoulder thereon and secured to an end of one tubular conductor, a female flange secured to an end of another tubular conductor and receiving said male flange therein, a plurality of circumferentially spaced independently movable pairs of clamping means, each of said clamping means having outwardly extending slots therein, fastener means passing through each of said slots and held in one of said flanges, each of said clamping means being movable relative to its fastener means, and a tie bar means pivotally connecting each pair of said clamping means together, so that each pair of said clamping means can be radially slid independently of other pairs relative to its fastener means into and out of locking engagement with the annular shoulder on the other of said flanges.

2. A wave guide flange assembly for connecting tubular conductors in end-to-end relationship, and comprising a male flange having an annular shoulder thereon and secured to an end of one tubular conductor, a female flange secured to an end of another tubular conductor and receiving said male flange therein, said female flange having an even number of substantially uniformly circumferentially spaced axial openings therein, clamping means movably mounted on said female flange, said clamping means comprising a pair of clamps for each pair of flange openings with each clamp having a slot therein and having a portion engageable with said male flange shoulder, the slots of each pair of clamps being parallel and cooperating with corresponding openings in said female flange, a tie bar interconnecting said pair of clamps into a unit, and fastener means passing through corresponding slots and flange openings so that each interconnected pair of clamps can be moved radially upon loosening of said fastener means with respect to the tubular conductors to connect and disconnect the same.

3. A wave guide assembly as claimed in claim 2 wherein the annular shoulder on said male flange faces away from the female flange.

4. A wave guide flange assembly as claimed in claim 3 wherein said clamp has a lip thereon engageable with the annular shoulder on said male flange.

5. A wave guide flange assembly as claimed in claim 2 wherein said fastener means comprises a pin having a circular cross section.

* * * * *